April 24, 1951 J. SELBY 2,550,383
PRESELECTOR MECHANISM FOR EFFECTING GEAR CHANGES
Filed March 5, 1948 3 Sheets-Sheet 1

James Selby
Inventor

By Eugene E. Stevens
Attorney

April 24, 1951      J. SELBY      2,550,383
PRESELECTOR MECHANISM FOR EFFECTING GEAR CHANGES Filed March 5, 1948      3 Sheets-Sheet 3

James Selby
Inventor

By Eugene E. Stevens
Attorney

Patented Apr. 24, 1951

2,550,383

UNITED STATES PATENT OFFICE 2,550,383

PRESELECTOR MECHANISM FOR EFFECT-
ING GEAR CHANGES

James Selby, Middlesex, England, assignor to Victoria Machine Tool Company Limited, London, England, a British company Application March 5, 1948, Serial No. 13,178
In Great Britain February 27, 1947

10 Claims. (Cl. 74—335)

This invention relates to preselector mechanism for effecting gear changes. The object of the invention is the provision of improved mechanism of this kind, which will be particularly useful in connection with the gears of machine tools.

The invention consists broadly of a preselector gear change mechanism, comprising a plurality of plungers, means whereby the movement of said plungers effects the gear changes, the speed ratio to which the gears are changed depending on the combination of positions to which said plungers are moved, means for supplying fluid pressure to move said plungers, and selector means for selectively obstructing said plungers, and thereby selecting the combination of positions to which they are moved, and therefore selecting the speed ratio to which the gears are changed.

In order that the invention may be the more clearly understood, a preselector mechanism in accordance therewith will now be described, reference being made to the accompanying drawings, wherein—

Figure 3:
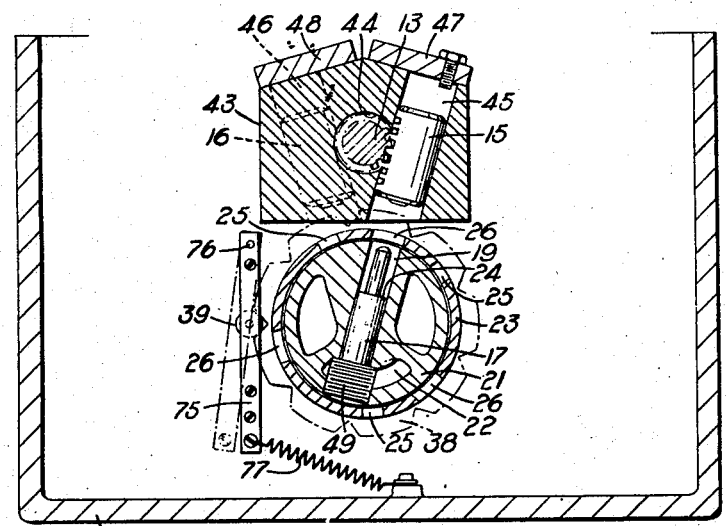
Figure 3 is a section on line III—III of Figure 2.

Referring to the drawings the references 1 and 2 designate two gear wheels which, to effect the various gear changes, have to be shifted axially along their shafts 3 and 4. The shifting of these gears is effected by means of gluts 5 and 6 which slide axially along respective fixed shafts 7 and 8. For shifting the gluts 5 and 6, the latter have racks 9 and 10 mounted on them, which are respectively engaged by pinions 11 and 12, coaxial with each other and side by side. The pinion 11 is fast with a smaller coaxial pinion 13 and the pinion 12 is fast with a smaller coaxial pinion 14, the pinions 13 and 14 being side by side as shown. The pinion 13 is engaged on opposite sides by two racks 15, only one of which is seen, and the pinion 14 is engaged on oposite sides by two racks 16. It is to be understood that all four of these racks 15 and 16 are in different planes transverse to the axis of the pinions. Thus looking at Figure 3 the unseen rack 15 is parallel to the seen rack 16 and in a plane in front of the plane of the section, and the unseen rack 16 is parallel to the seen rack 15, and in a plane behind that of the seen rack 16.

Figure 2:
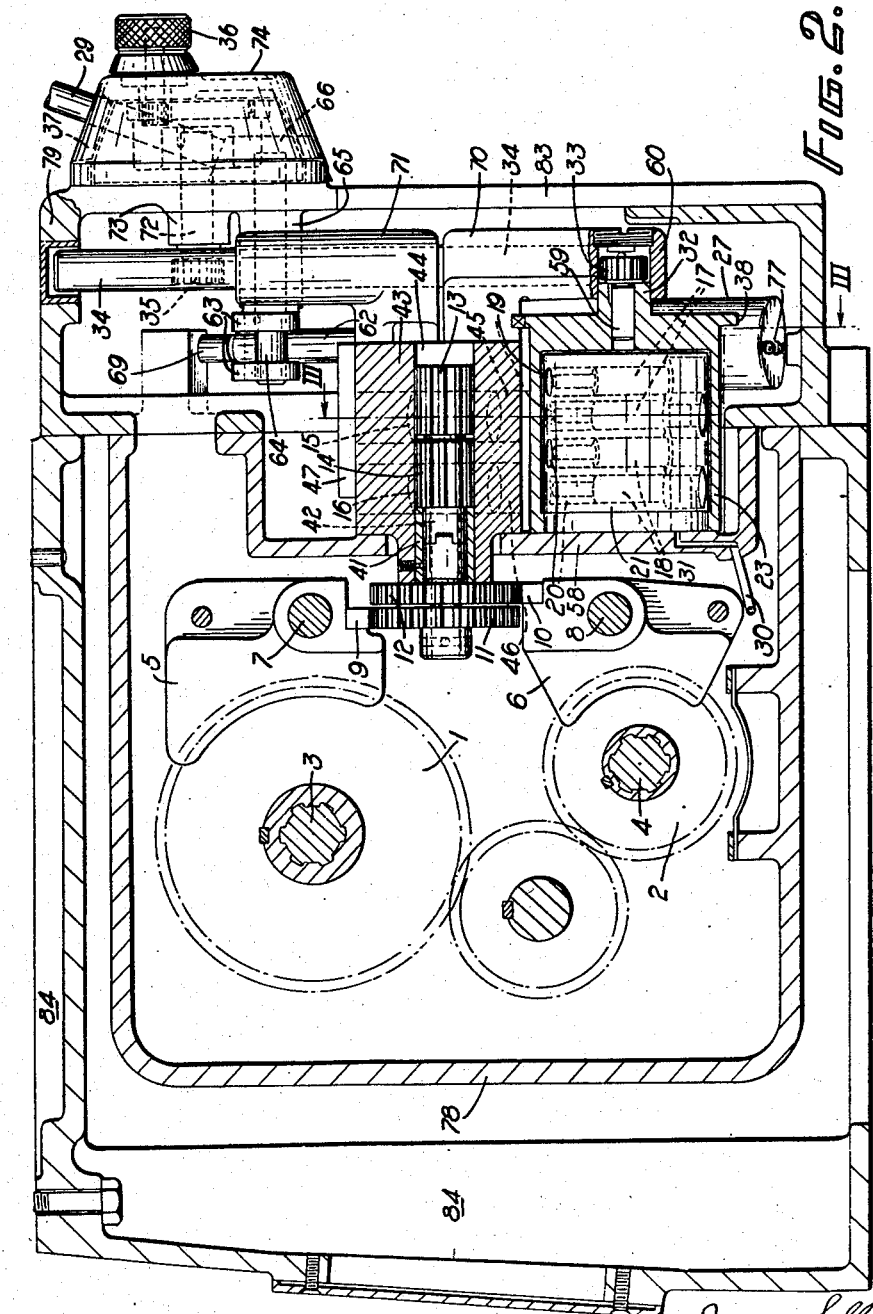
Figure 2 is a side elevation of the same looking from the left of Figure 1 and shown mainly in section.

The two racks 15 are adapted to be moved by means of two plungers 17 which are respectively more-or-less coaxial with said racks 15, and the two racks 16 are adapted to be moved by means of two plungers 18 which are respectively more-or-less coaxial with said racks 16. As will be clear from the drawing, the plungers 17 and 18 are all at the same end of the racks 15 and 16. Said plungers are spring biased away from said racks to limiting positions, and are adapted to be operated selectively by hydraulic pressure in opposition to their bias so as to abut against the ends of the racks and thereby move them. To rotate the pinion 13 counter clockwise (looking at Figure 3) and thereby move the glut 5 towards the eye (looking at Figure 2) the seen rack 15 must be moved by its plunger 17. To rotate said pinion 13 clockwise, and thereby move said glut 5 away from the eye, the unseen rack 15 must be moved by its plunger 17. In like manner to rotate the pinion 14 clockwise and thereby move the glut 6 towards the eye, the seen rack 16 must be moved by its plunger 18. To rotate said pinion 14 counter clockwise and thereby move said glut 6 away from the eye, the unseen rack 16 must be moved by its plunger 18.

The plungers 17, 17, 18, 18 move in respective bore holes 19, 19, 20, 20, formed radially in a cylindrical body 21. All four of these bore holes extend from a common space 22 in said body 21 and break out at the periphery of said body. Normally the plungers, under their bias occupy an in position at which they are wholly within their bore holes, but, when pressure liquid is applied to said space 22, all four of said plungers are forced outwardly, and would, in the absence of obstruction, project from their bore holes and engage their respective racks. In order to determine which of said plungers shall actually project from their bore holes and how far they shall project, a rotatable sleeve 23, is fitted on said cylindrical body, which sleeve has holes in it which selectively register with the bore holes according to the position of said sleeve.

More particularly it will be seen that the inner part only of each plunger makes the sliding fit in the bore hole 19 or 20 the outer part being of smaller diameter. A shoulder 24 is formed between said inner and outer parts. The holes in the sleeve 23 include relatively small holes 25 and relatively large holes 26.

When a small hole 25 registers with a given bore hole 19 or 20, only the small diameter portion of the corresponding plunger can pass through said small hole, and further outward movement of said plunger is prevented by the shoulder 24 abutting against the inner surface of said sleeve. When a large hole 26 registers with a given bore hole, the whole of the corresponding plunger can pass through said large hole. When neither a small nor a large hole registers with a given bore hole the corresponding plunger is retained wholly within its bore hole.

The operation will now be clear. When a given gear change is required, the sleeve 23 is rotated to a position corresponding to the required gear ratio and pressure fluid is applied to the common space 22. All the plungers will attempt to move outwards. As determined by the setting of the sleeve 23, certain of the plungers may project fully from their bore holes pressing the corresponding racks 15 or 16 to the full out position. Certain of said plungers may project half way from their bore holes pressing their corresponding racks to their half way position, and certain of said plungers will be retained wholly in their bore holes. It is clear that, when it is required to rotate a pinion 13 or 14 to one extreme position, and thereby move the corresponding glut 5 or 6 to one extreme position, the appropriate one of the two corresponding plungers must be permitted to move to its extreme out position and the other one must be retained wholly in its bore hole. When it is required to rotate a pinion 13 or 14 to its mid position, and thereby move the corresponding glut 5 or 6 to its mid position, both the two corresponding plungers must be permitted to move to their half out position. As soon as a gear change is effected, the pressure of the liquid in the space 22 is relaxed and all the plungers 17 and 18 return to their positions wholly within their bore holes, but the racks 15 and 16 stay in place with the gear change maintained. The sleeve 23 can now be rotated to preselect another gear ratio, whereupon a further application of liquid pressure to the space 22 will effect the required gear change.

It will be seen from the above that each glut 5 and 6 has three positions, and, assuming that in the normal way in the case of change gear mechanism for machine tools, the gear ratios controlled by said gluts operate in series, the total number of gear ratios provided by the mechanism as a whole will be nine. Obviously, however, there could be as many gluts and corresponding operating parts as desired, and in some cases a glut may have only two positions, according to the number of speed ratios required. For applying the liquid pressure to the space 22 a cylinder 27 is provided, having a plunger 28 in it. Said plunger is biased to the outer end of its stroke and is adapted to be moved in opposition to its bias by means of a hand lever 29. The inner end of the cylinder communicates by means of a pipe 30 (Figures 1 and 2) and a conduit 31 (Figure 2) with said space 22. The whole space, comprising said space 22, the space in the cylinder 27 and the communicating passages 30 and 31, is full of liquid, and it will be seen that, when the hand lever 29 is operated to press the plunger 28 inwards, pressure is applied in said space 22 and the gear change is effected. When said lever 29 is released the plunger 28 returns outwards under its bias and the pressure in the space 22 is relaxed.

For adjusting the sleeve 23, said sleeve is formed with a trunnion 32 on which is mounted a pinion 33. This pinion is in mesh with the teeth of a longitudinally reciprocable rack 34, whose teeth at the other end are in mesh with a pinion 35. Said pinion 35 is adapted to be rotated, through suitable gearing, by means of a hand adjusting knob 36, and it will thus be seen that, by rotating the hand adjusting knob 36 the sleeve 23 is adjusted.

The hand-adjusting knob 36 also actuates a calibrated dial 37 whereby is indicated the particular gear ratio which is preselected.

In order to ensure that the sleeve 23 will come to rest at correct positions corresponding to the gear ratios said sleeve has an annular flange 38 mounted on it against which a cam element 39 is spring biased. Said flange is formed with notches in which said cam element 39 fully engages when said sleeve is at the correct gear-ratio positions, the arrangement being such that if the adjusting knob 36 is left with the sleeve slightly misplaced from a correct gear-ratio position, the action of the spring-biased cam element 39 in the appropriate notch in the flange 38 will bring the sleeve precisely to the correct position.

In order to ensure that the gears shall be running relatively slowly as the gear change takes place, a limit switch 69 is provided which automatically cuts out the driving motor in response to the hand lever 29 being operated to effect the gear change, and restores the driving motor circuit when said hand lever is returned to its normal position. Thus the gears will always have slowed down by the time the gear change is made.

Figure 1:
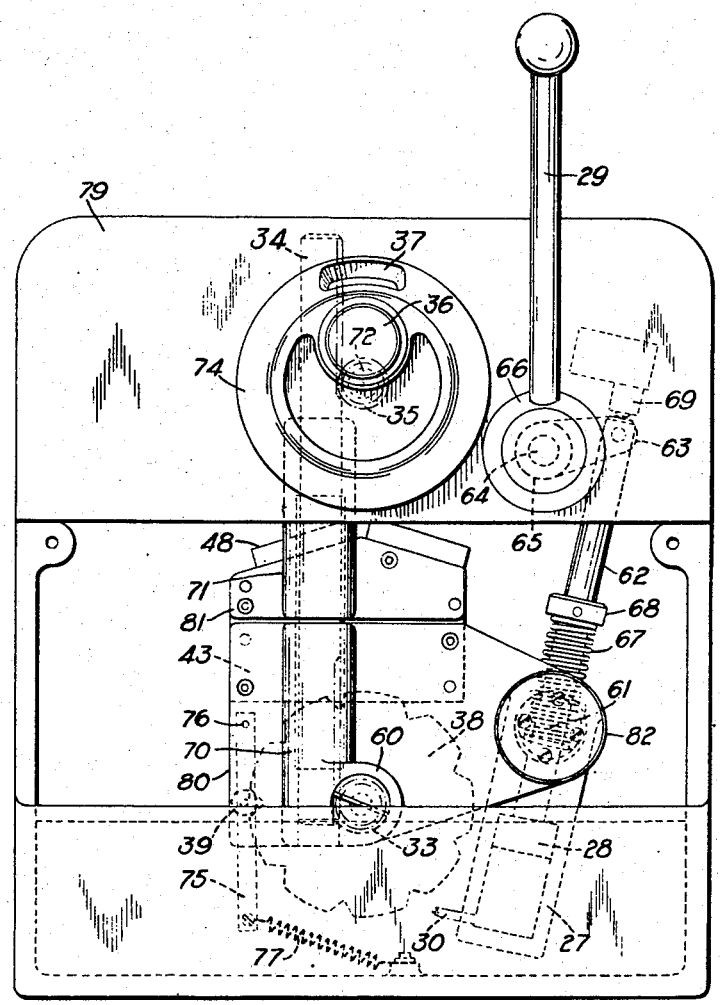
Figure 1 is a front elevation of said mechanism with a part of the front panelling removed.

In the case when the driving motor drives the change speed gearing through the transmission mechanism illustrated in Figure 1 my prior British Patent No. 593,123, accepted October 18, 1947, the limit switch 69 would be arranged automatically to energise the solenoid 17 of said prior patent, when the hand lever 29 is operated to effect the gear change, and thereby reduce the speed ratio of said transmission mechanism and cause the gears to be run dead slow when the gear change is being effected.

Describing now certain of the constructional details, for coupling the pinions 11 and 12 respectively to the pinions 13 and 14, the pinions 12 and 14 are both fast on the two ends of a hollow outer shaft 40 which runs in a fixed bearing 41. An inner shaft 42 passes through said hollow outer shaft 40 and projects at its two ends, beyond said pinions 12 and 14, and said pinions 11 and 13 are mounted fast on the projecting ends of said inner shaft 42. A fixed supporting block 43 is provided which has a horizontal bore hole 44 through it, in which, as will be clear from the drawing the bearing 41 is mounted and in which the two pinions 13 and 14 are housed. Said fixed supporting block 43 also has holes 45, 45 and 46, 46 through it in which the racks 15, 15 and 16, 16 are adapted to reciprocate, and these holes are covered at their outer end (i. e. at their end remote from the plungers 17 and 18) by means of cover plates 47 and 48.

Figure 4:
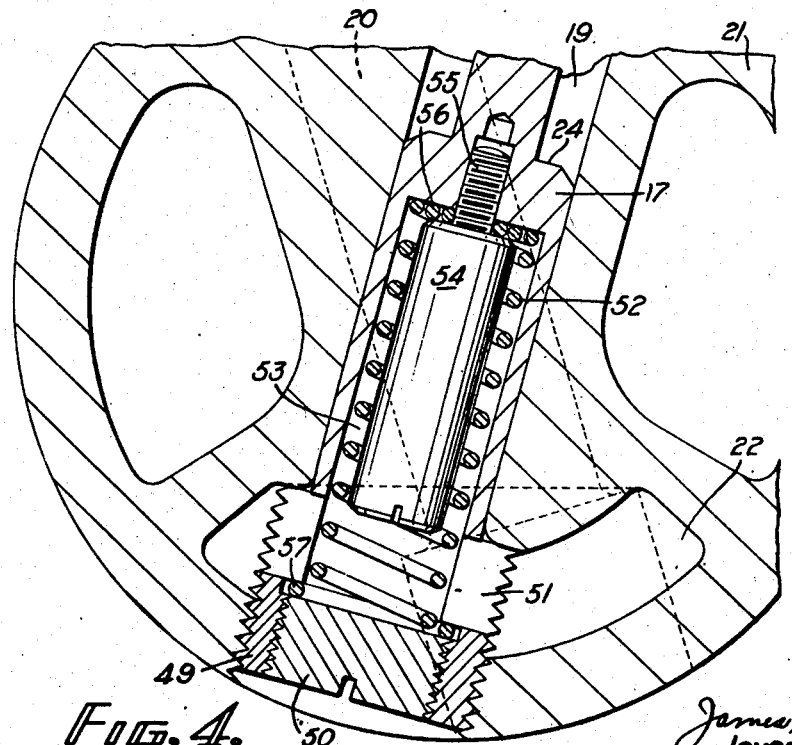
Figure 4 is a view to a larger scale of a portion of Figure 3.

To economise as far as possible with space the bore holes 19, 19, 20, 20 in the cylindrical body 21 are of more than radial length, and criss-cross each other as will be seen. Thus the common space 22 is near the circumferential periphery of the body 21 on the side remote from the racks. Referring particularly to Figure 4, it will be seen that said bores are initially bored diametrically right through the block 21 so as to traverse the space 22. At their ends remote from the racks said bores are then each counter bored to such an extent that the counter bore just traverses the space 22, and the counter bored portion is screw tapped and an externally screw threaded sleeve 49 is screwed into it. This sleeve 49 at its outer end, is plugged by means of a screw plug 50, and, at its inner end is formed with slots 51 which afford communication from the space 22 to the bore of said sleeve and therefore to the bore 19 or 20.

For inwardly biasing each of the plungers 17 and 18 a helical tension spring 52 is provided. The inner end of each plunger is bored axially at 53. A cylindrical body 54 is provided having a short screwed post 55 extending from one end thereof, and said screwed post is screwed into the bottom of the bore 53 to such an extent that a clearance is left between the end of said bore and the adjacent end of said body. There is also an annular clearance between the circumferential periphery of said body 54 and the circumferential periphery of the bore 53.

The helical spring 52 at its inner end has a few turns 56 of spirally diminishing radius, and at its outer end has one turn 57 of spirally increasing radius. Said spring is fitted in the annular space surrounding the body 54 with its turns 56 clamped between the inner end of said body and the bottom of the bore 53 and with its turn 57 clamped between the plug 50 and a shoulder in the bore of the sleeve 49 as will be clear from the drawing. Thus the spring is anchored at one end to the fixed sleeve and plug 49, 50, and at the other end to the plunger.

The cylindrical body 21 is secured at one end flush to a fixed plate 58. The sleeve 23 at one end abuts against the plate 58. The other end of said sleeve is closed and has the aforesaid trunnion 32 projecting from it. For connecting the pinion 33 to the trunnion 32 the former is fixed to a short stub axle 59 which is inserted into a bore hole in said trunnion and secured by means of a key. The trunnion 32 bears in a fixed bearing 60. Also, at its end adjacent to the plate 58 said sleeve bears on the cylindrical body 21. Over the rest of its surface to avoid undue friction said sleeve is just clear of said body as shown.

The cylinder 27 is mounted so as to pivot about a fixed axis 61. The plunger 28 has a plunger rod 62 rigidly extending from it, and said plunger rod at its outer end is coupled to a crank 63 on a crank shaft 64 which rotates in a fixed bearing 65. At one end said crank has fast on it a boss 66 to which the handle 29 is radially secured. The biasing of the plunger 28 to its out position is effected by means of a coil spring 67 in compression between the end of the cylinder 27 and a collar 68 on the plunger rod 62. It will be seen that when the hand lever 29 is pulled to the right (looking at Figure 1) the plunger 28 will be forced into the cylinder 27.

When the plunger 28 is at its normal out position the outer end of the plunger rod 62 engages the aforesaid limit switch, and as said plunger moves towards its in or operative position said rod 62 disengages said limit switch, and thus said limit switch functions, as heretofore described to ensure that the gears are running slowly when the gear change is effected.

Since the cylinder 27 rocks, it will be seen that the pipe 30 must be flexible. The conduit 31 is formed in the fixed plate 38 and leads direct to the space 22 which extends right up to the said plate 38.

The rack 34 slides in bearings 70 and 71. The pinion 35 is fast on a shaft 72 which runs in a fixed bearing 73. The adjusting knob 36 is mounted on the outside of a fixed boss-like casing 74, and gearing for coupling said knob to the shaft 72 is enclosed within said casing. The dial 37 is exposed through a window of said casing 74.

For biasing the cam element 39 against the flange 38 said cam element is mounted on a rocking bar 75 which pivots about a fixed point 76 and is biased about its pivot point by means of a tension spring 77.

The general arrangement will be clear from the drawing. Thus the mechanism is mounted in a casing comprising a main casting 78 in which are mounted the shafts 3, 4, 7, 8. This casting 78 is open at the front and has bolted over its open front a second casting 79. Said casting 79 has the boss-like casing 74 mounted on its outer face and also carries the bearings 65 and 73 and the limit switch 69. Said casting 79 has bolted to it a third casting which comprises the aforesaid fixed plate 58. This fixed plate, in addition to the cylindrical block 21, carries the supporting block 43.

Two further castings 80 and 81 are secured to the front face of said supporting block 43, which castings respectively comprise the bearings 70 and 71 for the rack 34. The casting 80 also comprises the bearing 60 for the trunnion 32, and a bearing 82 in which runs a stub shaft secured to the cylinder 27, for mounting said cylinder to rock about its axis 61.

A plate 83 removed in Figure 1 covers the opening in the front of the casting 79.

The reference 84 designates part of the machine (in the present case a machine tool) to which the apparatus is attached. This forms no part of the present invention.

The invention is clearly susceptible of a large number of modifications. For example the hydraulic plungers and racks need not be disposed radially, and the body 21 could have a flat surface instead of being cylindrical, in which case a perforated flat plate slidable on said flat surface would be employed instead of the sleeve 21.

Again, instead of racks on opposite sides of pinions, as heretofore described, the racks could be replaced by longitudinally reciprocable rods and the pinions by centrally fulcrumed levers each pivoted at its ends to a pair of the rods, the levers of course being fast on respective shafts which actuate the respective gluts.

Also it is possible to dispense with the hand operated cylinder 27 for supplying the hydraulic pressure and to use instead a fractional horse-power motor driving a small impeller. When this impeller is employed one would depress a push button to operate the motor and thus to generate a pressure supply within the common cavity. When the motor stops the fluid would be expelled by the retraction of the plungers and would flow past the stationary impeller.

A further modification is possible when the gear change mechanism is employed with certain hydraulically operated machines where a pressure supply is maintained for other purposes. In this case a small piston valve, or other suitable valve, would normally connect the common cavity to the fluid reservoir and manual depression of the piston valve endwise would cut off this connection and substitute a connection to the pressure source.

Either of these methods of effecting the required gear change by mere depression of a push button would be particularly useful in cases where the gluts are actually engaging and disengaging alternative friction clutches in order to obtain the various speeds. This is common practice in capstan lathes where some of the gears remain constantly in mesh and friction clutches keyed to the common shaft engage one or other of the rotating members on either side of the clutch.

It will be understood that, by the apparatus described, the gluts 5 and 6 are independently urged in the gear change direction by the hydraulic pressure so that, if one glut should be impeded the other one will be moved notwithstanding. Thus, assuming that the gear wheel 2 is later in the gear train than the gear wheel 1, if said gear wheel 2 is so positioned that it cannot engage the teeth of its mating gear wheel, this will not prevent the gear wheel 1 from engaging the teeth of its mating gear wheel, after which inching of the motor (if this should be necessary) will enable the gear wheel 2 to engage.

I claim:

1. In combination, a variable speed gear transmission, said transmission comprising gear-change elements shiftable in opposite directions, whose combination of positions determines the speed ratio of said transmission, a structure including a supporting block in which are formed a plurality of plunger spaces, plungers reciprocatable in said spaces, means biasing each plunger to one end of its stroke, means for supplying pressure fluid to said plunger spaces to urge said plungers to move in said plunger spaces in opposition to their biasing means, said plungers consisting of a number of pairs corresponding respectively to said gear-change elements, means whereby one plunger of each pair, by movement in opposition to its bias, moves, by simple abutment, the corresponding one of said gear-change elements in one direction, means whereby the other plunger of said pair, by movement in opposition to its bias, moves, by simple abutment, said corresponding one of said gear-change elements in the other direction, and a selector element mounted on said structure so as to be adjustably movable in a direction transversely to the direction of movement of said plungers, said selector element having holes through it of smaller and larger size, and said plungers having their ends which are towards said selector element of reduced diameter, whereby, according to the position to which said selector element is adjusted, one or more of said plungers may be entirely obstructed by said selector element, one or more of said plungers may pass to the extent of their reduced diameter portions only, through smaller holes, and one or more of them may pass to a greater extent than that of their reduced diameter positions, through larger holes, and thereby the combination of positions to which said gear-change elements are moved, upon temporary supply of said pressure fluid to said plunger spaces, is preselected.

2. In combination, a variable speed gear transmission, said transmission comprising gear-change elements shiftable in opposite directions, whose combinations of positions determines the speed ratio of said transmission, a cylindrical block, plunger spaces in said cylindrical block which break out at the circumferential periphery of said cylindrical block, plungers reciprocatable in said plunger spaces, means biasing each plunger inwardly of its plunger space, means for supplying fluid pressure to said plunger spaces to urge said plungers to move outwardly in opposition to said biasing means, said plungers consisting of a number of pairs corresponding respectively to said gear-change elements, means whereby one plunger of each pair, by movement outwardly of its plunger space, moves, by simple abutment, the corresponding one of said gear-change elements in one direction, means whereby the other plunger of said pair, by movement outwardly of its plunger space, moves, by simple abutment, said corresponding one of said gear-change elements in the other direction, a sleeve embracing said cylindrical block and rotatable thereabout, said sleeve having holes through it such that, according to the position to which said sleeve is rotatably adjusted, selected plungers are obstructed by said sleeve, while others are free to pass through said holes, and thereby the combination of positions to which said gear-change elements are moved, upon temporary supply of said pressure fluid to said plunger spaces, is preselected.

3. In combination, a variable speed gear transmission, said transmission comprising gear-change elements shiftable in opposite directions, whose combination of positions determines the speed ratio of said transmission, rotatable pinions corresponding respectively to said gear-change elements, means whereby the rotary position of each pinion determines the position of the corresponding gear-change element, a pair of longitudinally reciprocatable racks engaging each pinion on opposite sides thereof, a structure including a supporting block providing a plurality of plunger spaces, plungers reciprocatable in said spaces, means biasing each plunger to one end of its stroke, means for supplying pressure fluid to said plunger spaces to urge said plungers to move in said spaces in opposition to their biasing means, said plungers consisting of a number of pairs corresponding respectively to the pairs of racks, means whereby one plunger of each pair, by movement in opposition to its bias, moves, by simple abutment thereagainst, one rack of the corresponding pair, and thereby moves the corresponding pinion in one direction, means whereby the other plunger of said pair, by movement in opposition to its bias, moves, by simple abutment thereagainst, the other rack of said corresponding pair, and thereby moves said corresponding pinion in the other direction, and selector means for selectively obstructing said plungers, and thereby preselecting the combination of positions to which said pinions and therefore said gear-change elements are moved upon temporary supply of said pressure fluid to said plunger spaces.

4. In a control mechanism for a variable change speed gear transmission, the combination comprising gear-change elements shiftable in opposite directions, a cylindrical block including a series of bores, plungers reciprocatable in said bores, a fixed block positioned with respect to said cylindrical block, bores in said block, plungers containing rack teeth mounted in said bores, shafts carrying pinions mounted within said fixed block and engageable by the rack teeth of the plungers, pinions mounted at the ends of the shafts carrying the first mentioned pinions and engageable with racks mounted on the gear-change elements, a movable sleeve member for controlling the operation of the plungers in the cylindrical block, said plungers being biased inwardly within the recesses, and fluid means for moving the plungers in preselected sequence to engage the rack teeth plungers to operate the pinions and cause movement of the gear-change elements.

5. In a control mechanism for a variable change speed gear transmission, the combination comprising gear-change elements shiftable in opposite directions, a fixed cylindrical block having a plurality of radial bores therethrough, biased plungers mounted in said block, a cylindrical shell having holes therein mounted upon said block, a fixed block having radial bores therein and spaced with respect to the cylindrical block, a plurality of radial bores in said fixed block, rack-pistons mounted in said fixed block, pinion members mounted within the fixed block and engageable by the rack-pistons, shafts mounting said pinions and terminating at their outer ends in a further pair of pinions, said pinions being adapted to engage and move the gear-change elements, and fluid pressure means for reciprocating the plungers in the cylindrical block to engage the rack-pinions to cause movement of the gear-change elements.

6. The combination stated in claim 5, and a hand lever and a piston operable by said lever to cause fluid to pass within the cylindrical block to operate the plungers.

7. The combination stated in claim 5, and a spring biased cam member engageable with an operating pinion of the rotatable shell to hold the shell in preselected gear changing positions.

8. In combination, a variable speed gear transmission, a structure affording a plurality of plunger spaces, plungers reciprocatable in said plunger spaces, means whereby movement of said plungers in said spaces to different combinations of positions effects changes of said transmission to corresponding different speed ratios, means for supplying pressure fluid to said spaces to urge said plungers to move in said spaces, and a selector element mounted on said structure so as to be adjustably movable in a direction transversely to the direction of movement of said plungers, said selector element having apertures through it and said plungers being formed with shoulders, whereby according to the position to which said selector element is adjusted it may entirely obstruct one or more of said plungers, while one or more of said plungers may pass as far as their shoulders through apertures of said selector element, and one or more of said plungers may pass beyond their shoulders through apertures of said selector element, and thereby the combination of positions to which said plungers are moved upon supply of said pressure fluid to said cylinder spaces is preselected.

9. In combination, a variable speed gear transmission, a structure affording a plurality of plunger spaces, plungers reciprocatable in said plunger spaces, means whereby movement of said plungers in said spaces to different combinations of positions effects changes of said transmission to corresponding different speed ratios, means for supplying pressure fluid to said spaces to urge said plungers to move in said spaces, and a selector element mounted on said structure so as to be adjustably movable in a direction transversely to the direction of movement of said plungers, said selector element having holes through it of smaller and larger size, and said plungers having their ends which are towards said selector element of reduced diameter, whereby, according to the position to which said selector element is adjusted, it may entirely obstruct one or more of said plungers, while one or more of said plungers may pass to the extent of their reduced diameter portions only through smaller holes and one or more of them may pass to a greater extent than that of their reduced diameter portions through larger holes, and thereby the combination of positions to which said plungers are moved upon supply of said pressure fluid to said cylinder spaces is preselected.

10. In combination, a variable speed gear transmission, a cylindrical block, plunger spaces in said cylindrical block which break out at the circumferential periphery of said cylindrical block, plungers reciprocatable in said plunger spaces, means whereby movement of said plungers in said spaces to different combinations of positions effects changes of said transmission to corresponding different speed ratios, means for supplying pressure fluid to said spaces to urge said plungers to move outwardly in said spaces, a sleeve embracing said cylindrical block and rotatable thereabout, said sleeve having apertures such that, according to the position to which said sleeve is rotatably adjusted, it selectively obstructs certain of said plungers while permitting other of said plungers to pass said apertures, and thereby the combination of positions to which said plungers are moved, upon supply of said pressure fluid to said cylinder spaces is preselected.

JAMES SELBY.

REFERENCES CITED

The following references are of record in the file of this patent:

UNITED STATES PATENTS

| Number | Name | Date |
| --- | --- | --- |
| 2,167,790 | Whitehead | Aug. 1, 1939 |
| 2,376,673 | Duchaussoy | May 22, 1945 |
| 2,383,616 | Randol | Aug. 28, 1945 |
| 2,417,051 | Banker | Mar. 11, 1947 |

FOREIGN PATENTS

| Number | Country | Date |
| --- | --- | --- |
| 145,628 | Great Britain | Apr. 7, 1921 |
| 685,302 | Germany | Dec. 15, 1939 |
| 806,181 | France | Dec. 9, 1936 |
| 848,276 | France | Oct. 26, 1939 |